US012641437B2

(12) United States Patent
Elumalai et al.

(10) Patent No.: US 12,641,437 B2
(45) Date of Patent: May 26, 2026

(54) GEOFENCING FOR INTERNET-OF-THINGS DEVICES

(71) Applicant: T-Mobile USA, Inc., Bellevue, WA (US)

(72) Inventors: Anbalagan Elumalai, Issaquah, WA (US); Paul Marvin Lim Chy, Snohomish, WA (US); Anupama Malireddy, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 131 days.

(21) Appl. No.: 18/786,283

(22) Filed: Jul. 26, 2024

(65) Prior Publication Data

US 2026/0032447 A1     Jan. 29, 2026

(51) Int. Cl.
| | |
|---|---|
| *H04W 12/64* | (2021.01) |
| *G16Y 10/75* | (2020.01) |
| *G16Y 40/50* | (2020.01) |
| *H04L 12/28* | (2006.01) |
| *H04W 12/126* | (2021.01) |
| *H04W 24/02* | (2009.01) |
| *H04W 64/00* | (2009.01) |

(52) U.S. Cl.
CPC ......... *H04W 12/64* (2021.01); *H04L 12/2825* (2013.01); *H04W 12/126* (2021.01); *H04W 24/02* (2013.01); *H04W 64/006* (2013.01); *G16Y 10/75* (2020.01); *G16Y 40/50* (2020.01); *H04L 2012/2841* (2013.01)

(58) Field of Classification Search
CPC ... H04W 12/64; H04W 12/126; H04W 24/02; H04W 64/006; H04L 12/2825; H04L 2012/2841; G16Y 10/75; G16Y 40/50
See application file for complete search history.

(56) References Cited

U.S. PATENT DOCUMENTS

| | | | |
|---|---|---|---|
| 9,894,159 | B2 | 2/2018 | Chen et al. |
| 10,091,830 | B2 | 10/2018 | Kress et al. |

(Continued)

FOREIGN PATENT DOCUMENTS

| | | |
|---|---|---|
| CN | 109996304 A | 7/2019 |
| CN | 110086755 A | 8/2019 |

(Continued)

*Primary Examiner* — Brian Whipple
(74) *Attorney, Agent, or Firm* — Perkins Coie LLP

(57) ABSTRACT

The present invention relates to geofencing for Internet-of-Things (IoT) devices. A geofence within which an IoT device is authorized to operate is provisioned to an IoT device managed by an IoT service enablement platform. The IoT device transmits recurrent location estimates to the IoT service enablement platform over a wireless network using the Lightweight Machine-to-Machine (LwM2M) protocol. Upon receiving a first location estimate indicating that the IoT device is outside the geofence, the platform determines the device's location relative to the geofence. If the device is determined to be outside the geofence, the platform transmits an execute operation to the IoT device using the LwM2M protocol. This operation hides one or more values of the IoT device from access by its processor, thereby restricting the device's functionality and securing the device when it is outside the authorized geofence.

20 Claims, 6 Drawing Sheets

IoT Device
200

Processor(s) 202

Location Module 204

Communication Module 206

Device Control Module 208

Sensor(s) 210

(56) References Cited

U.S. PATENT DOCUMENTS

| | | | |
|---|---|---|---|
| 10,250,435 B2 | 4/2019 | Suryanarayana | |
| 10,313,914 B2 | 6/2019 | Huang et al. | |
| 10,477,395 B2 | 11/2019 | Bahrami et al. | |
| 10,484,477 B2 | 11/2019 | Nasir et al. | |
| 10,686,670 B2 | 6/2020 | Patra et al. | |
| 10,764,374 B1 | 9/2020 | Marquardt et al. | |
| 10,819,794 B2 | 10/2020 | Shim et al. | |
| 10,841,772 B2 | 11/2020 | Sundar Pal et al. | |
| 10,855,800 B2 | 12/2020 | Boyapalle et al. | |
| 10,976,714 B2 | 4/2021 | Moss et al. | |
| 11,055,299 B2 | 7/2021 | Foerster et al. | |
| 11,089,065 B2 | 8/2021 | Slovetskiy | |
| 11,115,193 B2 | 9/2021 | Wei et al. | |
| 11,133,984 B2 | 9/2021 | Newell et al. | |
| 11,263,099 B2 | 3/2022 | Ahmet et al. | |
| 11,463,130 B1 | 10/2022 | Garner et al. | |
| 11,489,676 B2 | 11/2022 | Soundararajan et al. | |
| 11,502,998 B2 | 11/2022 | Nagarajan et al. | |
| 11,799,983 B2 | 10/2023 | Tov et al. | |
| 11,816,089 B2 | 11/2023 | Foerster et al. | |
| 2017/0238129 A1* | 8/2017 | Maier | H04W 4/14 |
| | | | 455/404.2 |
| 2018/0376448 A1 | 12/2018 | Wild et al. | |
| 2020/0092376 A1 | 3/2020 | Morris | |
| 2020/0211721 A1 | 7/2020 | Ochoa et al. | |
| 2021/0075680 A1 | 3/2021 | Younger et al. | |
| 2022/0407786 A1* | 12/2022 | Jiménez | H04L 67/34 |
| 2024/0179062 A1 | 5/2024 | Sivaswamy et al. | |
| 2024/0323643 A1* | 9/2024 | Kent | H04W 4/021 |

FOREIGN PATENT DOCUMENTS

| | | |
|---|---|---|
| CN | 106657364 B | 5/2020 |
| CN | 108881304 B | 9/2020 |
| CN | 110798452 B | 1/2021 |
| DE | 112017008033 T5 | 7/2020 |
| KR | 101690968 B1 | 12/2016 |
| KR | 101878314 B1 | 7/2018 |
| KR | 101880999 B1 | 7/2018 |
| KR | 102632029 B1 | 1/2024 |
| WO | 2017039757 A1 | 3/2017 |
| WO | 2018121572 A1 | 7/2018 |
| WO | 2018121573 A1 | 7/2018 |
| WO | 2018158047 A1 | 9/2018 |
| WO | 2019184599 A1 | 10/2019 |
| WO | 2021262320 A1 | 12/2021 |

* cited by examiner

GEOFENCING FOR INTERNET-OF-THINGS DEVICES

BACKGROUND

Internet-of-Things (IoT) devices have revolutionized various sectors by enabling seamless connectivity and automation. These devices, ranging from smart home appliances and wearable health monitors to industrial sensors and connected vehicles, offer unprecedented convenience, efficiency, and data-driven insights. However, the proliferation of IoT devices also brings significant risks, particularly the threat of device theft. IoT devices can be placed in publicly accessible areas, and the value of these devices makes it likely that some of these devices will be stolen. Moreover, IoT devices often contain sensitive data and can serve as entry points to larger networks, making them attractive targets for cybercriminals. The physical theft of these devices can lead to unauthorized access to personal information, corporate data, and critical infrastructure systems. As such, it is imperative to implement safeguards to mitigate the risks associated with IoT device theft.

BRIEF DESCRIPTION OF THE DRAWINGS

Detailed descriptions of implementations of the present invention will be described and explained through the use of the accompanying drawings.

Figure 1:
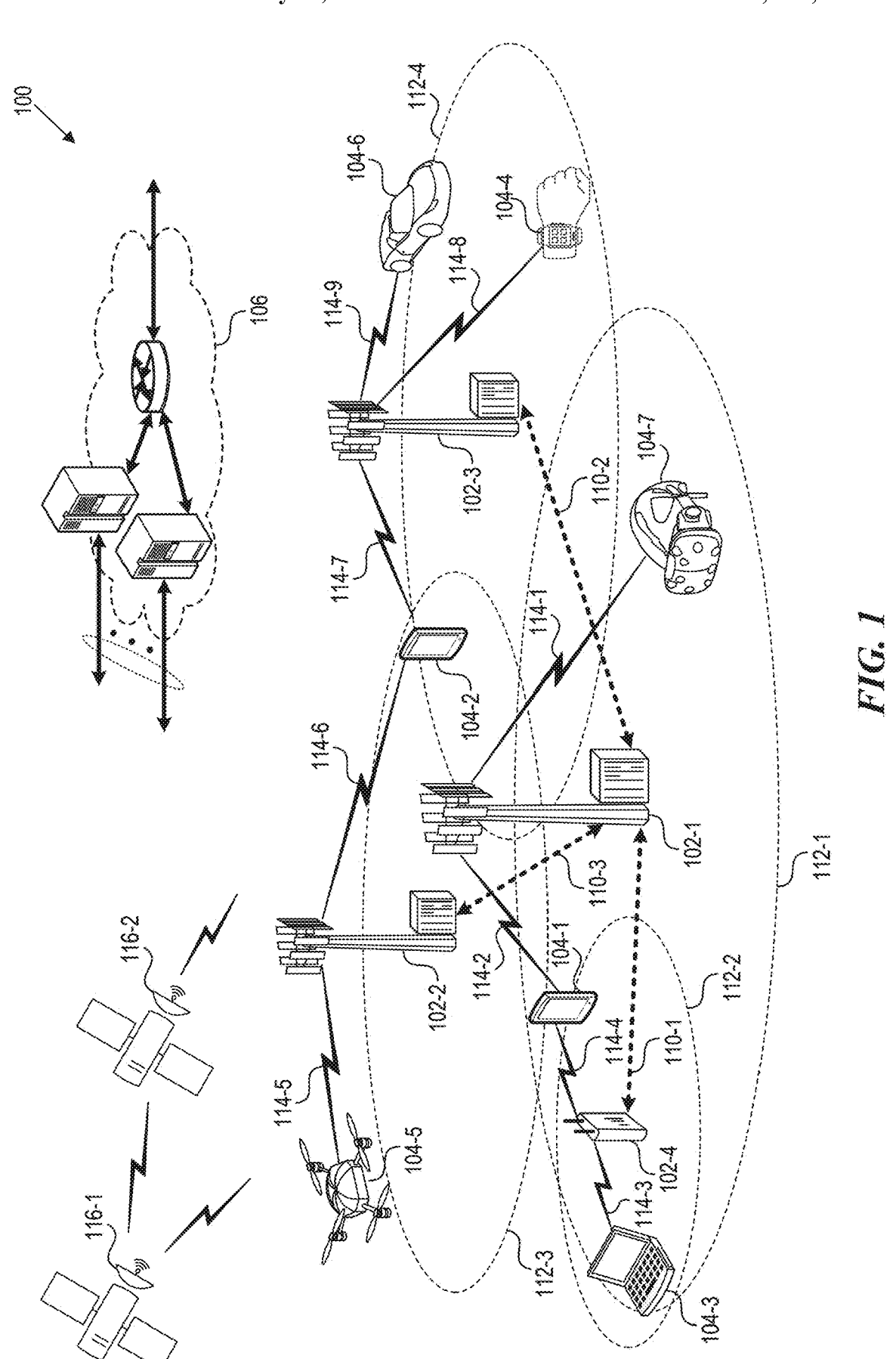
FIG. 1 illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Industrial applications for IoT devices have continued to increase, improving the efficiency and monitoring of industrial operations. For example, IoT devices including sensors and actuators can be used to optimize manufacturing processes, improve supply chain management, and enhance predictive maintenance, thereby reducing downtime and operational costs. In agriculture, IoT devices monitor soil conditions, weather patterns, and crop health, enabling precision farming practices that increase yield and resource efficiency. IoT devices are deployed in smart cities to manage traffic flow, reduce energy consumption, and improve public safety. In the shipping industry, IoT devices are revolutionizing fleet management, cargo tracking, and port operations. Smart sensors installed on ships and containers monitor parameters such as temperature, humidity, and location, ensuring the safe and efficient transport of goods. These devices provide real-time data that helps in optimizing routes, reducing fuel consumption, and improving overall operational efficiency. IoT technology also enhances security by enabling continuous monitoring of vessels and cargo, detecting unauthorized access or tampering. In ports, IoT systems streamline operations by automating processes such as cargo handling, inventory management, and equipment maintenance, leading to faster turnaround times and reduced operational costs. Thus, IoT devices are continuing to become more prevalent in society.

Given the prevalence of IoT devices, these devices pose a theft risk. Specifically, people may attempt to steal IoT devices to sell the device or access sensitive data on the device. For example, a malicious actor can steal an IoT device used to collect temperature data and sell the device on secondary markets. Similarly, a malicious actor may steal an IoT device used by a corporate entity to gain access to information about the entity or its users (e.g., to sell the information or plan a cyberattack). Given that many of these devices are attached to public areas, additional techniques for physically protecting the devices to prevent theft may be difficult to implement.

To address this problem and others, the present technology provides a mechanism for securing IoT devices remotely through the use of geofences. An IoT service enablement platform can manage one or more IoT devices over a wireless communication network. The IoT service enablement platform can provision geofences in which each IoT device is authorized to operate. When the IoT device leaves a geofence in which it is authorized to operate, the IoT device can be locked to prevent access to one or more values stored on the IoT device. For example, confidential information on the IoT device can be hidden when the device is locked. In doing so, the risk of a thief accessing sensitive information after stealing the IoT device can be reduced, and where this was the motivation for stealing the device, the risk of theft for the device can be reduced. Alternatively, one or more values needed for the IoT device to communicate on the wireless network can be hidden to prevent the IoT device from operating. In this way, the device can be rendered inoperable when it is removed from the geofence, reducing its value to potential thieves and thus reducing the likelihood that the device is stolen.

The IoT device can be authorized to operate only within a particular geographic region at which the IoT device was placed. For example, if the IoT device is used to track a cargo shipment between ports, a geofence associated with the IoT device can be provisioned along the intended shipping route. In this way, if the IoT device is removed from the geofence (e.g., because it has been stolen or is being used for an unauthorized purpose), the device can be rendered inoperable or sensitive information on the device can be hidden from access. In other cases, the sensitive information can be remotely erased from the device to provide even greater security. Accordingly, the overall security of the device can be improved, and the risk of theft can be reduced.

The IoT service enablement platform can manage the one or more IoT devices using a current communication interface. For example, the IoT service enablement platform can communicate with the IoT devices using a Lightweight Machine-to-Machine (LwM2M) protocol. When the IoT devices are operating, the IoT devices can report their location to the IoT service enablement platform. Accordingly, the IoT service enablement platform can use these same location estimates to determine whether the IoT devices are located within a provisioned geofence. If not, the IoT service enablement platform can communicate a command to cause the IoT device to hide one or more values from a processor of the IoT device. This command can be communicated using a resource defined in an LwM2M object—for example, an LwM2M device object. The resource can be custom-defined within the LwM2M object to enable an IoT device to be locked in various ways when the IoT device leaves a geofence provisioned to the IoT device.

When the IoT device is brought back into the geofence, the IoT device can be unlocked from the IoT service enablement platform, for example, using a resource defined in the LwM2M object. In this way, the IoT device can continue to be used if a later attempt is made to use the device in an authorized way—for example, if the IoT device is recovered from a malicious actor and the owner of the IoT device wishes to put the IoT device back into operation or if the IoT device was never stolen but was accidentally removed from the geofence.

The IoT service enablement platform enables the owner of the IoT device to remotely manage the IoT device. For example, in some embodiments, the IoT service enablement platform only unlocks the IoT device in response to an owner of the IoT device authorizing the unlock. Alternatively, or additionally, the owner of the IoT device can relocate a geofence in which the IoT device is authorized to operate. Thus, the owner of the IoT device can authorize the IoT device to operate differently to accommodate different uses for the IoT device.

Moreover, the present technology enables the IoT service enablement platform to remotely manage the IoT device even in remote locations, which may be important for some applications that are performed in remote locations (e.g., overseas shipment or military applications). For example, the IoT device can communicate using cellular networks or non-terrestrial networks (NTNs) that provide a wider coverage region and are more likely to provide coverage in remote locations. In this way, the IoT device can remain connected even when outside a limited coverage region provided by cellular networks. These NTNs may be resource-constrained, however, making it wasteful to communicate on these networks at all times. Thus, the IoT device can determine a most appropriate network for communicating with the IoT service enablement platform, accounting for the connectivity of the device and the difference in resources provided by the available networks.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples. Wireless Communications System FIG. 1 is a block diagram that illustrates a wireless telecommunication network 100 ("network 100") in which aspects of the disclosed technology are incorporated. The network 100 includes base stations 102-1 through 102-4

(also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 (Gigahertz) GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid Automatic Repeat Request (HARQ) to provide retransmission at the MAC layer to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a UE, a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of the network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The DL transmissions can also be called forward link transmissions while the UL transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, an NTN is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service (QoS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and core architecture to achieve Control and User Plane Separation (CUPS) and achieve extremely low user plane latency. In yet another example of 6G, the network 100 can implement a converged Wi-Fi and core architecture to increase and improve indoor coverage.

Example IoT Device

Figure 2:
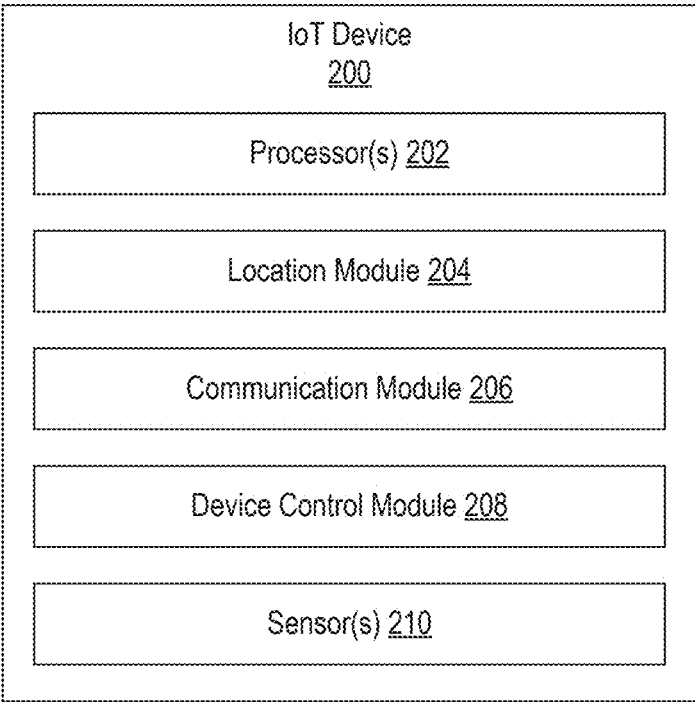
FIG. 2 illustrates an example IoT device in which aspects of the present technology can be implemented.

FIG. 2 illustrates an example IoT device 200 in which geofencing for IoT devices can be implemented. The IoT device 200 can take any suitable physical form. For example, the IoT device 200 can include wearable devices, smart home devices, industrial devices, connected vehicles, healthcare devices, agricultural devices, smart city devices, environmental sensors, or the like. In aspects, the IoT device 200 can be implemented in an industrial environment in which the IoT device 200 provides monitoring or tracking of commercial activities. In some cases, the IoT device 200 can operate at least part of the time within remote areas outside the coverage of cellular networks. For example, the IoT device 200 can be placed on cargo shipped overseas, in a rural area such as an agricultural farm or solar farm, or in any other remote location.

The IoT device 200 includes at least one processor 202. The processor 202 can execute machine-readable instructions to manage and execute all computational tasks performed by the IoT device 200. For example, the various modules of the IoT device 200 can include machine-readable instructions executed by the processor 202. The processor 202 can be located at the IoT device 200 or remotely coupled with the IoT device 200. In aspects, the processor 202 can be a central processor or an application-specific processor.

The IoT device 200 includes a location module 204 responsible for providing location estimates of the IoT device 200. The location module 204 can include machine-readable instructions executable by the processor 202. The location module 204 can determine the location of the IoT device 200 using any appropriate mechanism. For example, the location module 204 can implement a Global Navigation Satellite System (GNSS) to determine device location through signals received from one or more satellites. In other cases, the location module 204 can determine its location through triangulation from proximate devices (e.g., base stations, other IoT devices, or other wireless devices). The location module 204 can continually track the location of the IoT device 200 or determine the location of the IoT device 200 at different times (e.g., at predetermined intervals or in response to collecting data that is to be reported with a location estimate). The location module 204 can determine the latitude, longitude, or elevation of the IoT device 200. The location module 204 can similarly determine the speed of the IoT device 200 based on differences in location estimates determined by the location module 204. Moreover, the location module 204 can determine a timestamp that corresponds with the location estimate. In this way, the location module 204 can ensure that the location information is accurate and up to date.

The IoT device 200 includes a communication module 206 implemented through machine-readable instructions executable by the processor 202. The communication module 206 can be used to communicate data collected by the IoT device 200 to an owner or manager of the IoT device 200—for example, if the IoT device 200 can report collected data or operational data to the owner or manager of the IoT device 200 using a wireless communication network. Similarly, the communication module 206 can receive commands from an IoT service enablement platform (discussed with greater detail with respect to FIG. 3) that manages the IoT device 200. In aspects, the communication module 206 can communicate using any wireless communication technology. For example, the communication module 206 can communicate using a cellular network or an NTN.

Moreover, the communication module 206 can communicate using any communication protocol. In aspects, the communication module 206 can communicate using an LwM2M protocol, which provides a structured protocol for managing multiple IoT devices and their connectivity. For example, the LwM2M protocol can organize device data into a hierarchical structure of objects, instances, and resources. Each resource can represent a specific piece of data or functionality, such as sensor readings or control commands. The communication module 206 can use this structure to manage and exchange data efficiently. For example, the communication module 206 can periodically send data to the platform, such as sensor readings, status updates, or alerts. The communication module 206 can further provide encryption, authentication, and integrity protection for the data exchanged, safeguarding it from unauthorized access and tampering.

Given that the IoT device 200 can communicate using cellular networks or NTNs, the communication module 206 can determine a most appropriate network on which the IoT device 200 is to communicate. The communication module 206 can determine the most appropriate network based on the networks available to the IoT device 200, the resources available on these networks, and preferences for networks available to the IoT device 200. In some cases, resources within LwM2M objects can be used to determine the most appropriate network on which to communicate. For example, a radio signal strength resource (e.g., of a connectivity monitoring object (Object ID: 4)) can be used to determine the most appropriate network. The most appropriate network can similarly be determined based on network type (e.g., indicated by a cellular connectivity resource in the connectivity monitoring object). For example, when a cellular network is available (e.g., and has adequate signal strength), the cellular network can be preferred over the NTN. In this way, the resources of the resource-constrained NTN can be preserved when not necessary for communicating with the IoT device. In other cases, preferred networks (e.g., in a custom-defined LwM2M object) or networks to which the IoT device 200 is to auto-connect (e.g., indicated in an auto-connect resource of an access point name (APN) connection profile object (Object ID: 11)) can be defined for the IoT device 200, and the IoT device 200 can communicate using these networks when they are available.

The communication module 206 can format the data into a particular configuration. For example, the collected data or operational data can be reported with a location estimate or a timestamp of the IoT device 200. The data can be communicated using resources of LwM2M objects (e.g., an LwM2M object associated with the location of an IoT device (Object ID: 6)). For example, the latitude of the device can be reported in a latitude resource (Resource 0) of the location object, the longitude of the device can be reported in a longitude resource (Resource 1) of the location object, the timestamp can be reported in a timestamp resource (Resource 5) of the location object, and the speed of the device can be reported in a speed resource (Resource 6) of the location object. Data that the location estimate accompanies can be reported on a corresponding resource of an LwM2M object.

The IoT device 200 includes a device control module 208 that can control operation of the IoT device 200. In aspects, the device control module 208 is used to perform operations at the IoT device 200 based on signaling received from the IoT service enablement platform through the communication module 206. For example, the communication module 206 can receive commands from the IoT service enablement platform to lock or unlock the device. In aspects, the commands can be communicated using resources of LwM2M objects. For example, an LwM2M device object (Object ID: 3) can be used to control operation of the IoT device 200. The communication module 206 can receive commands associated with a resource defined in the LwM2M device object or any other LwM2M object to lock or unlock the IoT device 200.

In general, the communication module 206 can receive read, write, or execute commands associated with a resource of an LwM2M object. A read command can cause the device control module 208 to retrieve the current value of a resource from an LwM2M object. When the IoT service enablement platform issues a read command, the IoT device 200 responds with the requested data. The read command can be used to monitor the status or configuration of the IoT device 200. The write command can cause the device control module 208 to update the value of a resource within an LwM2M object. Write operations can be used by the IoT service enablement platform to configure or control the IoT device 200 remotely. When a write command is issued, the device control module 208 can update the specified resource with the new value provided by the IoT service enablement platform. The execute command can be used to trigger a specific action or operation on the IoT device 200 by the device control module 208. Unlike read and write commands, which deal with data values, the execute command can initiate a predefined function or procedure on the IoT device 200. When the IoT service enablement platform issues an execute command, the device control module can perform the corresponding action.

In some cases, an execute command on a custom-defined resource of the LwM2M device object or any other LwM2M object (e.g., custom-defined or otherwise) can be used to lock or unlock the IoT device 200. For example, the device control module 208 can lock the IoT device 200 by hiding one or more values of the IoT device 200 from the processor 202. As a specific example, one or more values used to authenticate the IoT device 200 can be hidden from the processor 202 to prevent the IoT device 200 from being able to authenticate and perform one or more intended operations. In some embodiments, the one or more values can include an authentication key used to authenticate the IoT device 200 to enable the IoT device 200 to communicate on the wireless network. In other cases, the one or more values can include sensitive information that is to be hidden when the IoT device 200 leaves the geofence. The one or more values hidden by the device control module 208 can be defined by the resource of the LwM2M object in which the execute command is issued. Thus, the device control module 208 can lock the device to prevent operation of the IoT device 200 or hide sensitive data stored on the IoT device 200 from a malicious actor.

In some cases, the device control module 208 can erase values stored on the IoT device 200 in response to a command from the IoT service enablement platform received through the communication module 206. For example, the device control module 208 can erase one or more values (e.g., all values, sensitive values, or any other set of values) stored on the IoT device 200. In aspects, the erase operation can be performed in response to execute operations or write operations issued on one or more resources of one or more LwM2M objects. Thus, the one or more values erased by the device control module 208 can be defined by the one or more resources of the one or more LwM2M objects in which the execute or write commands are issued.

The device control module 208 can similarly unlock the IoT device 200 in response to a command from the IoT service enablement platform received through the communication module 206. In aspects, the unlock operation can be performed in response to execute operations issued on one or more resources of one or more LwM2M objects. In some embodiments, the unlock operation can be performed in response to an execute command issued on a custom-defined resource of an LwM2M device object. The unlock operation can cause the device control module 208 to provide access to the one or more values hidden from the processor 202 in the lock operation. Thus, the unlock operation can be used to return the operability of the IoT device 200 or provide access to sensitive data at the IoT device 200.

The IoT device 200 includes one or more sensors 210 used to collect data to provide functionality to the IoT device 200. For example, the sensors 210 can include any sensor that can collect data to be reported by the IoT device. As a specific example, the sensors 210 can include a temperature sensor when the IoT device 200 is used to monitor the temperature of an environment of the IoT device 200. As non-limiting examples, the sensors 210 can include temperature sensors, humidity sensors, pressure sensors, proximity sensors, light sensors, motion sensors, accelerometers, gyroscopes, magnetometers, gas sensors, sound sensors, image sensors, vibration sensors, flow sensors, and so on. The data collected by the sensors 210 can be reported to an owner or manager of the IoT device 200 (e.g., at the IoT service enablement platform) through the communication module 206.

In some embodiments, the sensors 210 can include tamper sensors. Tamper sensors can be used to detect unauthorized access or physical interference with the IoT device 200. These sensors can enhance the security and integrity of the IoT device 200 by monitoring for signs of tampering, such as opening the device casing, removing it from its installed location, attempting to access values at the device, or attempting to disable the functionality of the IoT device 200. Data collected by the tamper sensors can be sent to the IoT service enablement platform or a security system using the communication module 206. For example, when a tamper event is detected, the sensors can trigger an alert, which can be sent to the IoT service enablement platform or a security system for immediate action. This alert can prompt various responses, such as logging the event, notifying security personnel, or activating countermeasures to protect sensitive data and maintain the device's operational integrity.

Example IoT Service Enablement Platform

Figure 3:
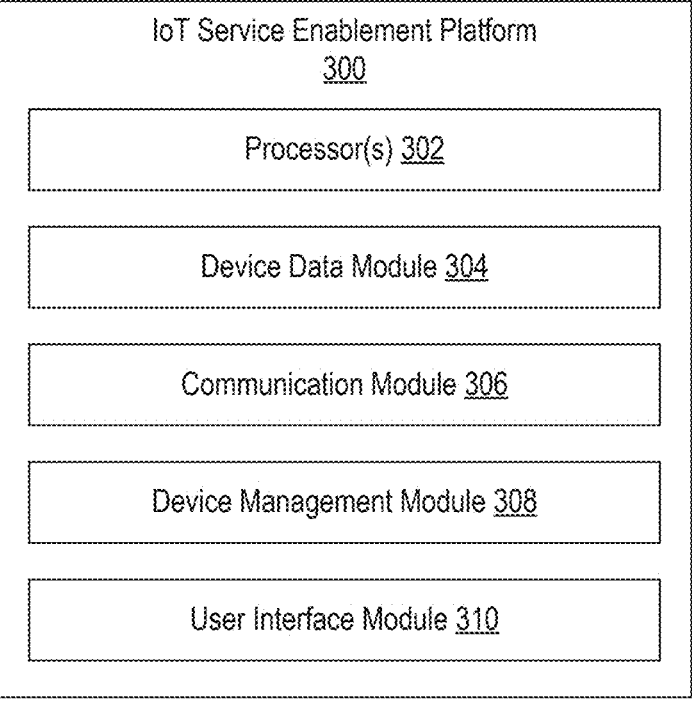
FIG. 3 illustrates an example IoT service enablement platform in which aspects of the present technology can be implemented.

FIG. 3 illustrates an example IoT service enablement platform 300 in which geofencing for IoT devices can be implemented. The IoT service enablement platform 300 can be hosted on a server of a provider of the wireless network. Thus, the IoT service enablement platform 300 can be a service provided to users who connect their IoT devices using the wireless network. In this way, the users can manage their IoT devices and remotely receive data from their IoT devices over the wireless network.

The IoT service enablement platform 300 includes at least one processor 302. The processor 302 can execute machine-readable instructions to manage and execute all computational tasks performed by the IoT service enablement platform 300. For example, the various modules of the IoT service enablement platform 300 can include machine-readable instructions executed by the processor 302. The processor 302 can be located at the IoT service enablement platform 300 or remotely coupled with the IoT service enablement platform 300. In aspects, the processor 302 can be a central processor or an application-specific processor.

The IoT service enablement platform 300 includes a device data module 304 responsible for receiving and storing data from one or more IoT devices managed by the service enablement platform (e.g., IoT device 200 illustrated in FIG. 2). For example, the device data module 304 can receive sensor data collected by the wireless device and communicated over the wireless network by the IoT devices. In aspects, the device data module 304 can store location estimates provided by the IoT devices. For example, the IoT devices can communicate their locations using latitude, longitude, timestamp, and speed resources of an LwM2M location object, and the device data module 304 can store the location estimates.

The IoT service enablement platform 300 includes a communication module 306 that can communicate with the IoT devices over the wireless network. The communication module 306 can communicate using any communication protocol. In aspects, the communication module 306 can communicate using the LwM2M protocol, which can be used to manage multiple IoT devices. The communication module 306 can communicate data in accordance with a particular format. For example, the communication module 306 can receive and transmit commands within resources of LwM2M objects.

The IoT service enablement platform 300 includes a device management module 308 that can issue commands to control operation of the IoT devices using the communication module 306. The device management module 308 can define custom resources within existing or custom-defined LwM2M objects to control operations on the device. For example, the device management module 308 can define lock and unlock resources that can be used to lock or unlock an IoT device managed by the IoT service enablement platform 300. The lock or unlock resources can be defined in an existing LwM2M object, such as the LwM2M device object, or a custom-defined LwM2M object. Given that the lock and unlock resources are custom-defined, the device management module 308 can determine the procedures to take to lock and unlock the IoT devices. For example, the lock and unlock features can be defined to hide/show particular values of the IoT devices when the device is locked/unlocked. In some embodiments, the lock feature can erase values of the IoT device. In other embodiments, the device management module 308 can define one or more other resources that can be used to erase one or more values of the IoT devices (e.g., in response to a determination that the device has been stolen or left an associated geofence).

The device management module 308 can analyze data received from the IoT devices to determine which operations are needed to control the IoT devices. For example, the device management module 308 can store, in association with the IoT devices managed by the IoT service enablement platform, geofences in which an associated IoT device is authorized to operate. The device management module 308 can compare location estimates received from the IoT devices to these devices' geofences to determine whether the devices are within or outside the geofences. If an IoT device is outside of its associated geofence, the device management module 308 can issue a command (e.g., an execute command), through the communication module 306, to the IoT device to lock the device. The commands can be communicated using resources of LwM2M objects, such as the LwM2M device object.

Similarly, the IoT device can continue to report location estimates even after the device has been locked. Thus, when the IoT device returns to its associated geofence, the device can communicate its location to the IoT service enablement platform. The device management module 308 can compare this location estimate to a geofence of the IoT device and determine that the IoT device has returned to the geofence. In response to this determination, the device management module 308 can issue a command to the IoT device to unlock the device. For example, the device management module 308 can issue an execute command on a custom-defined unlock resource of an existing LwM2M object (e.g., the LwM2M device object) or custom-defined LwM2M object.

Moreover, the device management module 308 can determine if further security measures are needed to protect the IoT device based on sensor data received from the IoT device. For example, the device management module 308 can analyze data collected by tamper sensors of the IoT device to determine if the IoT device has been stolen. If so, the device management module 308 can issue a command to erase one or more values of the device to prevent a malicious actor from accessing sensitive information on the device.

The device management module 308 can also alter management configurations of each of the IoT devices. For example, the device management module 308 can relocate the geofences in which each IoT device is authorized to operate. Similarly, the device management module 308 can alter the lock or unlock procedures for each of the IoT devices. For example, the device management module can redefine lock or unlock resources used to lock or unlock an IoT device. In aspects, this can include adjusting the values that are hidden/shown in the lock/unlock configuration, performing new security procedures to lock the device, altering whether an execute operation of the lock resource of an IoT device erases values, adjusting the values erased by the lock resource, and so on.

The user (or owner/manager) of the IoT devices can view operations of their IoT devices through the IoT service enablement platform 300. For example, the IoT service enablement platform 300 includes a user interface module 310 that enables users of the IoT devices to control operation of the device and view data provided by the IoT devices. In aspects, the user interface module 310 can present data received from the IoT devices to users of the IoT devices to enable these users to benefit from and manage their devices. For example, the user can view sensor data collected by their IoT devices and communicated to the IoT service enablement platform 300. In aspects, the user interface module 310 can report events determined from data received from the IoT devices. For example, the user interface module 310 can be used to present events in which their IoT device leaves a geofence provisioned to the IoT device or tamper events when tamper data indicates that the IoT device has been tampered with.

The device configurations and lock and unlock of the device can be controlled by a user (or owner/manager) of the IoT devices. For example, the user can set which operations are to be performed when the device is locked/unlocked. The device management module 308 can define the lock/unlock resources in accordance with this setting provided by the user. The user can specify which values are to be hidden, what security procedures are to be performed, or what device values should be erased (if any) when the IoT device is locked. If specific approval is needed to erase values on the device when it is removed from the geofence or when a tamper event is detected, this approval can similarly be provided through the user interface module 310. Similarly, the user can specify what unlock operations are to be performed when using the user interface module 310. For example, the user can indicate whether a locked device should be unlocked when the device is brought back into the geofence, whether specific approval is needed before the device should be unlocked, or whether the device should remain locked even when brought back into the geofence. If specific approval is needed to unlock the device when it is brought back into the geofence, this approval can similarly be provided through the user interface module 310.

The user interface module 310 can also be used to relocate a geofence provisioned to an IoT device. For example, a user can specify a new location in which the IoT device is authorized to operate. The device management module 308 can respond by storing the new location as the geofence associated with the IoT device, thereby causing received location estimates to be compared against the new geofence location. In aspects, the initial location of the geofence can be configured on the IoT devices. In yet other aspects, even the initial geofence of the IoT devices can be provided by the user through the user interface module 310.

Geofencing for IoT Devices

Figure 4:
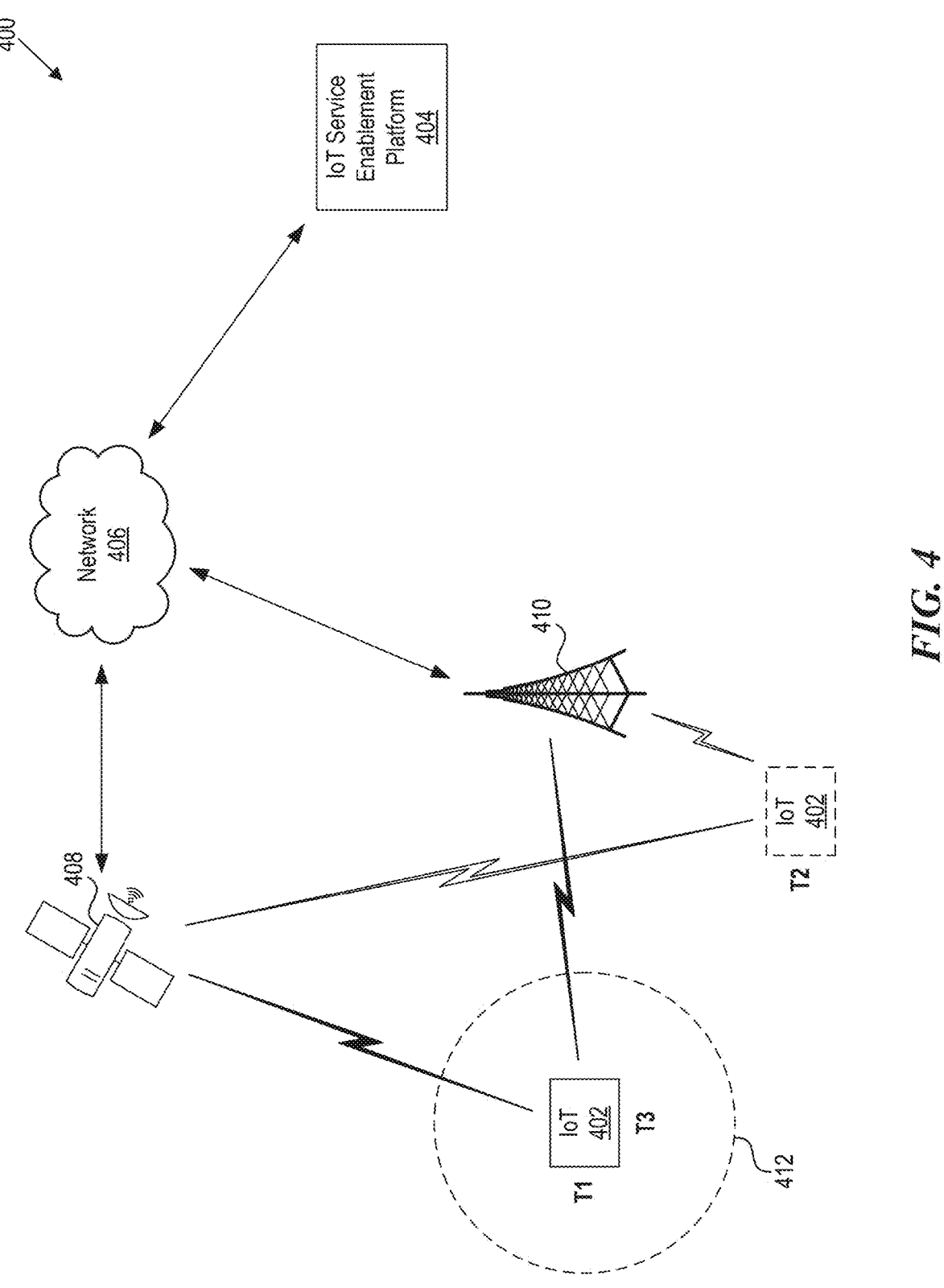
FIG. 4 illustrates an example operating environment in which aspects of the present technology can be implemented.

FIG. 4 illustrates an example operating environment 400 for geofencing for IoT devices. As illustrated, the environment includes an IoT device 402, a service enablement platform 404, a network 406, a satellite 408 implementing an NTN, a base station 410 implementing a cellular network, and a geofence 412 in which the IoT device 402 is authorized to operate. In aspects, the service enablement platform 404 manages operation of the IoT device 402 through the network 406. The IoT device 402 can communicate with the IoT service enablement platform 404 (e.g., location or sensor data reporting) through the network 406 using the satellite 408 or the base station 410. The IoT service enablement platform 404 can control operation of the IoT device 402 based on its location within or outside of the geofence 412. As illustrated, the IoT device 402 is located within the geofence 412 at a first time, T1, and a third time, T3, while the IoT device 402 is located outside of the geofence 412 at a second time, T2, between the first time and the third time.

The geofence 412 can be provisioned to the IoT device 402 during registration with the IoT service enablement platform 404. For example, the IoT device 402 can be preconfigured with the geofence 412 such that the location of the geofence 412 is communicated when the IoT device 402 first connects with the IoT service enablement platform 404. In some embodiments, the geofence 412 can be provisioned during bootstrapping of the IoT device 402. The geofence 412 can further be updated over time. For example, if the user wishes to deploy the IoT device 402 in a new location, the user can communicate the new location to the IoT service enablement platform 404 to cause the geofence 412 to be relocated to the new location. In general, the location of the geofence 412 can be stored at the IoT service enablement platform 404 in association with the IoT device 402 to be compared with location estimates of the IoT device 402.

The IoT device 402 can transmit location estimates to the IoT service enablement platform 404 using the network 406. In aspects, the location estimates can accompany sensor or other data from the IoT device 402 or can be discrete location estimates provided solely for the purpose of updating the IoT service enablement platform 404 with the location of the IoT device 402. The location estimates can be transmitted at predetermined intervals, in response to a location request from the IoT service enablement platform, in response to an event that causes the IoT device 402 to communicate data to the IoT service enablement platform, or at any other time. The IoT device 402 can communicate using NTNs implemented using satellites (e.g., satellite 408) or cellular networks implemented using base stations (e.g., base station 410). In some embodiments, the IoT device 402 can determine a most appropriate network to communicate on.

At the first time, T1, the IoT device 402 is located within the geofence 412. The IoT device 402 can communicate one or more estimates of its location to the IoT service enablement platform 404. The IoT service enablement platform 404 can compare the location estimates to the location of the geofence 412 to determine if the IoT device 402 resides within the geofence. At the first time, T1, the IoT device 402 is within the geofence 412. Accordingly, the IoT service enablement platform 404 can determine that the IoT device 402 is within the geofence 412 and keep the IoT device 402 unlocked.

At the second time, T2, the IoT device 402 is moved outside of the geofence 412. The IoT device 402 can communicate one or more estimates of its location to the IoT service enablement platform 404, which compares the estimates against the location of the geofence 412. In this way, the IoT service enablement platform 404 can determine that the IoT device 402 is located outside the geofence 412 and respond by issuing a command to lock the IoT device 402. The command to lock the IoT device 402 can be issued using the LwM2M protocol, for example, using a custom-defined resource of an LwM2M object. The IoT device 402 can receive the command and perform one or more operations to lock the device. For example, the IoT device 402 can hide one or more values of the IoT device 402 from access by a processor. The values can be used for operation of the IoT device 402 (e.g., for authentication, computation, or any other function). Thus, hiding the values from the processor can disable one or more functions of the device or protect sensitive data held at the IoT device 402. The IoT device 402 can remain locked until an unlock command is issued to the IoT device 402. The IoT device 402 can report a successful lock operation to the IoT service enablement platform 404, which can maintain the status of the IoT device 402 as locked.

The IoT service enablement platform 404 can further initiate one or more additional security features to protect the IoT device 402. For example, the IoT service enablement platform 404 can issue a command to erase one or more values from the IoT device 402, for example, using a custom-defined resource of an LwM2M object. In some embodiments, the command to erase the one or more values from the IoT device 402 is performed only when the device is determined to have been stolen or tampered with. For example, tamper sensors can collect data related to tampering with the IoT device 402, and the tamper data can be analyzed by the IoT service enablement platform 404 to determine if the IoT device 402 has been stolen or tampered with. If so, the IoT service enablement platform 404 can issue a command to erase one or more values of the IoT device 402. In some embodiments, the one or more values are erased only if a user of the IoT device 402 approves erasure of the values. This approval can be provided beforehand by the user or in response to determining that the IoT device 402 has been stolen/tampered with or left the geofence 412. The IoT device 402 can report a successful erase operation to the IoT service enablement platform 404, which can maintain the status of the IoT device 402 as wiped.

At the third time, T3, the IoT device 402 returns to the geofence 412. The IoT device 402 can communicate location estimates to the IoT service enablement platform 404, which compares the estimates to the location of the geofence 412 and determines that the IoT device 402 is located within the geofence 412. In response, the IoT service enablement platform 404 can issue a command to unlock the IoT device 402, for example, using a custom-defined resource of an LwM2M object. The IoT device 402 can receive the command and perform one or more operations to unlock the IoT device 402. Unlocking the IoT device 402 can include, for example, granting the processor of the IoT device 402 access to the one or more values previously hidden in the lock operation, writing values previously erased during the lock operation, or the like. In some embodiments, the IoT device 402 is unlocked only if a user of the IoT device 402 approves the device unlock. This approval can be provided beforehand by the user or in response to determining that the IoT device 402 has reentered the geofence 412. The IoT device 402 can report a successful unlock operation to the IoT service enablement platform 404, which can maintain the status of the IoT device 402 as unlocked.

Figure 5:
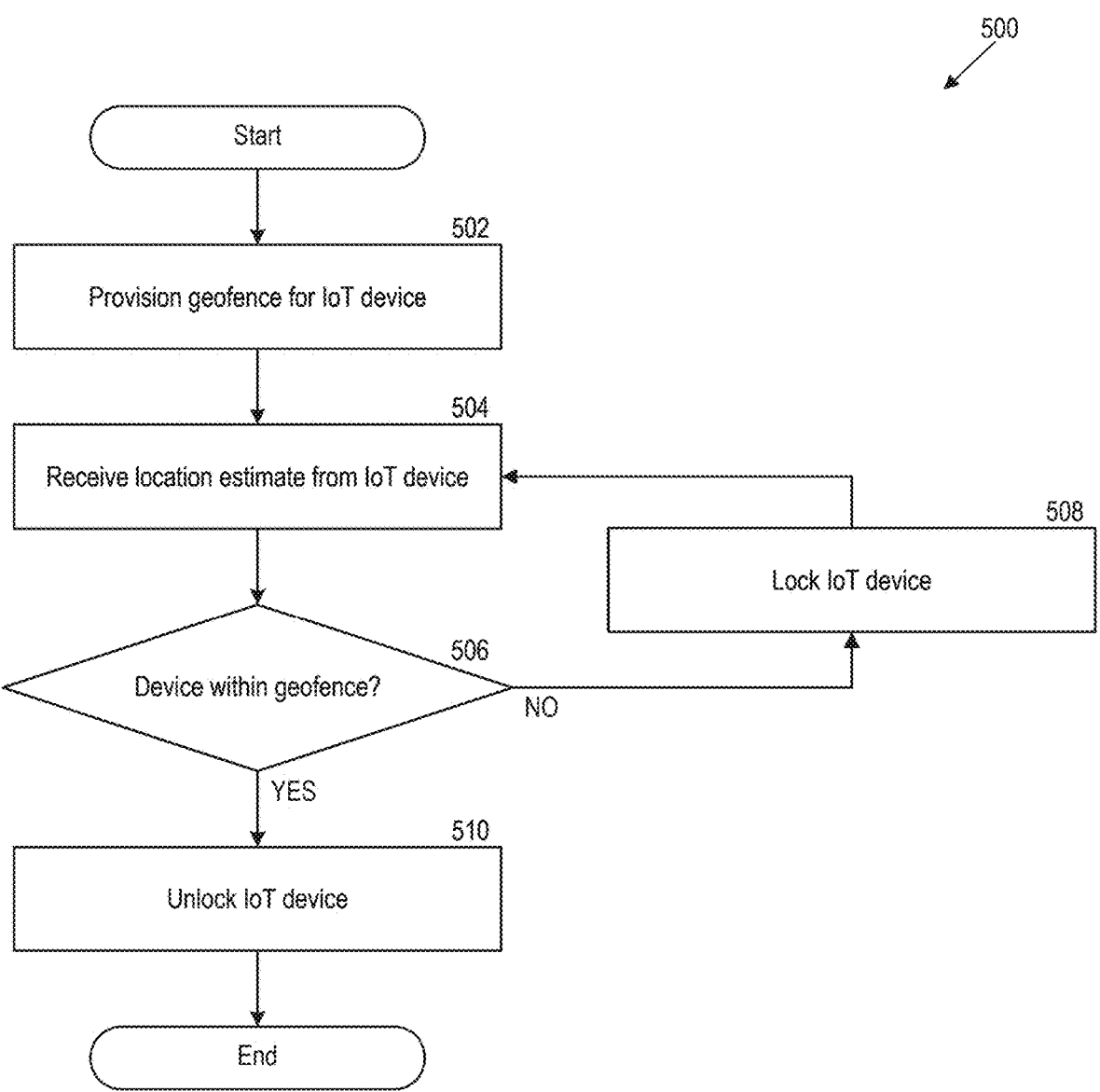
FIG. 5 illustrates an example method in accordance with aspects of the present technology.

FIG. 5 illustrates an example method 500 for securing IoT devices using geofences. Although illustrated in a particular configuration, one or more operations of the method 500 may be omitted, repeated, or reorganized. Additionally, the method 500 may include other operations not illustrated in FIG. 5—for example, operations detailed in one or more other methods described herein.

At 502, a geofence can be provisioned for an IoT device managed by an IoT service enablement platform. The geofence can correspond to an area in which the IoT device is authorized to operate. The geofence can be provisioned on the IoT device directly, during a bootstrapping of the IoT device, or by the IoT service enablement platform based on input from a user of the IoT device. In aspects, the location of the geofence can be updated by the user of the IoT device over time through the IoT service enablement platform. The location of the geofence can be stored at the IoT service enablement platform to be compared against location estimates of the IoT device.

At 504, the IoT service enablement platform receives location estimates from the IoT device. For example, the location estimates can include recurring location estimates transmitted to the IoT service enablement platform (e.g., at predetermined intervals, in response to events in which sensor data from the IoT device is reported to the IoT service enablement platform, in response to a request from the IoT service enablement platform to report a location of the IoT device, or at any other time periods). The location estimates can be communicated using the LwM2M protocol, for example, using resources of an LwM2M location object.

At 506, the IoT service enablement platform compares the received location estimates to the geofence provisioned to the IoT device. If the IoT device is located outside of the geofence, the IoT service enablement platform can issue commands to cause the IoT device to be locked at 508. The IoT service enablement platform can further perform other security operations, such as wiping the device. If the IoT device is within the geofence or later returns to the geofence, the IoT service enablement platform can issue commands to cause the IoT device to be unlocked at 510. In some cases, unlocking the IoT device can be performed only if permission for the user of the IoT device is granted.

Computer System

Figure 6:
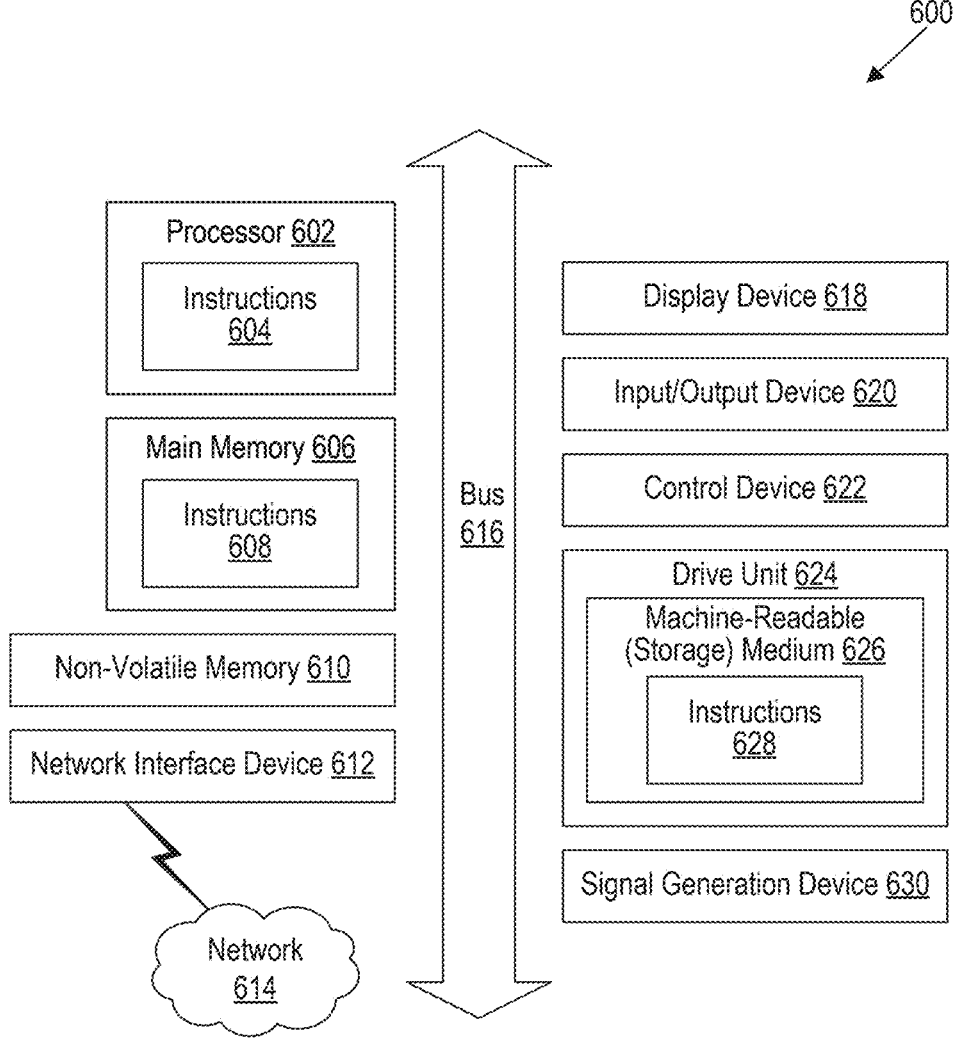
FIG. 6 illustrates an example computer system in which at least some aspects of the present technology can be implemented.

FIG. 6 is a block diagram that illustrates an example of a computing system 600 in which at least some operations described herein can be implemented. As shown, the computing system 600 can include one or more processors 602, main memory 606, non-volatile memory 610, a network interface device 612, a display device 618, an input/output device 620, a control device 622 (e.g., keyboard and pointing device), a drive unit 624 that includes a machine-readable (storage) medium 626, and a signal generation device 630 that are communicatively connected to a bus 616.

The bus 616 represents one or more physical buses and/or point-to-point connections that are connected by appropriate bridges, adapters, or controllers. Various common components (e.g., cache memory) are omitted from FIG. 6 for brevity. Instead, the computing system 600 is intended to illustrate a hardware device on which components illustrated or described relative to the examples of the figures and any other components described in this specification can be implemented.

The computing system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR system (e.g., head-mounted display), or any electronic device capable of executing a set of instructions that specifies action(s) to be taken by the computing system 600. In some implementations, the computing system 600 can be an embedded computing system, a system-on-chip (SOC), a single-board computing (SBC) system, or a distributed system such as a mesh of computing systems, or it can include one or more cloud components in one or more networks. Where appropriate, one or more computing systems 600 can perform operations in real time, in near real time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 606, non-volatile memory 610, machine-readable (storage) medium 626) can be local, remote, or distributed. Although shown as a single medium, the machine-readable (storage) medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computing system 600. The machine-readable (storage) medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the Detailed Description above using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein unless the Detailed Description above explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A method comprising:
provisioning, to an Internet-of-Things (IoT) device and within an IoT service enablement platform, a geofence within which the IoT device is authorized to operate;
receiving, from the IoT device, at the IoT service enablement platform, over a wireless network, and using a Lightweight Machine-to-Machine (LwM2M) protocol, recurrent location estimates of a location of the IoT device,
wherein a first location estimate of the recurrent location estimates of the location of the IoT device is outside of the geofence;
in response to receiving the first location estimate, determining, based on the first location estimate, that the IoT device is located outside of the geofence; and
in response to determining that the IoT device is located outside of the geofence, transmitting, from the IoT service enablement platform to the IoT device using the LwM2M protocol, an execute operation of a resource defined in an LwM2M Object to hide one or more values of the IoT device from access by a processor of the IoT device.

2. The method of claim 1, further comprising, in response to determining that the IoT device is located outside of the geofence, transmitting, from the IoT service enablement platform to the IoT device using the LwM2M protocol, a command to erase the one or more values of the IoT device.

3. The method of claim 1, further comprising:

in response to determining that the IoT device is located outside of the geofence, receiving an indication that the IoT device has been stolen or tampered with; and in response to receiving the indication that the IoT device has been stolen or tampered with, transmitting, from the IoT service enablement platform to the IoT device using the LwM2M protocol, a command to erase the one or more values of the IoT device from access by the processor of the IoT device.

4. The method of claim 1, further comprising:

after transmitting the execute operation of the resource defined in the LwM2M Object to hide the one or more values of the IoT device from access by the processor of the IoT device, receiving, from the IoT device, at the IoT service enablement platform, over the wireless network, and using the LwM2M protocol, a second location estimate of the location of the IoT device, wherein the second location estimate is within the geofence;

in response to receiving the second location estimate, determining, based on the second location estimate, that the IoT device is located within the geofence; and in response to determining that the IoT device is located within the geofence, transmitting, from the IoT service enablement platform to the IoT device using the LwM2M protocol, an execute operation of an additional resource defined in the LwM2M Object to grant access to the one or more values of the IoT device to the processor of the IoT device.

5. The method of claim 1, further comprising:

after transmitting the execute operation of the resource defined in the LwM2M Object to hide the one or more values of the IoT device from access by the processor of the IoT device:

receiving, from a user of the IoT device, permission to unlock the device when the IoT device returns to within the geofence; and receiving, from the IoT device, at the IoT service enablement platform, over the wireless network, and using the LwM2M protocol, a second location estimate of the location of the IoT device, wherein the second location estimate is within the geofence;

in response to receiving the second location estimate, determining, based on the second location estimate, that the IoT device is located within the geofence; and in response to determining that the IoT device is located within the geofence and receiving the permission to unlock the device when the IoT device returns to within the geofence, transmitting, from the IoT service enablement platform to the IoT device using the LwM2M protocol, an execute operation of an additional resource defined in the LwM2M Object to grant access to the one or more values of the IoT device to the processor of the IoT device.

6. The method of claim 1, further comprising:

receiving, from a user of the IoT device and at the IoT service enablement platform, a command to relocate the geofence within which the IoT device is authorized to operate to a new location; and in response to receiving the command to relocate the geofence to the new location, adjusting the geofence to correspond to the new location.

7. The method of claim 1, wherein receiving the recurrent location estimates of the location of the IoT device comprises writing to a longitude resource and a latitude resource defined in an LwM2M Location Object.

8. The method of claim 1, wherein the first location estimate is received using a non-terrestrial wireless communication network.

9. The method of claim 1, wherein the resource defined in the LwM2M Object to hide the one or more values of the IoT device from access by the processor of the IoT device is a custom-defined resource.

10. An Internet-of-Things (IoT) service enablement platform comprising:

at least one hardware processor; and at least one non-transitory memory storing instructions that, when executed by the at least one hardware processor, cause the IoT service enablement platform to:

receive, from an IoT device, over a wireless network, and using a Lightweight Machine-to-Machine (LwM2M) protocol, a first location estimate of a location of the IoT device, wherein the first location estimate is outside of a geofence within which the IoT device is authorized to operate;

in response to receiving the first location estimate, determine, based on the first location estimate, that the IoT device is located outside of the geofence; and in response to determining that the IoT device is located outside of the geofence, transmit, to the IoT device using the LwM2M protocol, a command to hide one or more values of the IoT device from access by a processor of the IoT device.

11. The IoT service enablement platform of claim 10, wherein the command to hide the one or more values of the IoT device from access by the processor of the IoT device comprises an execute operation of a resource defined in an LwM2M Object.

12. The IoT service enablement platform of claim 10, wherein the instructions further cause the IoT service enablement platform to:

in response to determining that the IoT device is located outside of the geofence, receive an indication that the IoT device has been stolen or tampered with; and in response to receiving the indication that the IoT device has been stolen or tampered with, transmit, from the IoT service enablement platform to the IoT device using the LwM2M protocol, a command to erase the one or more values of the IoT device.

13. The IoT service enablement platform of claim 10, wherein the instructions further cause the IoT service enablement platform to:

after transmitting the command to hide the one or more values of the IoT device from access by the processor of the IoT device:

receive, from a user of the IoT device, permission to unlock the device when the IoT device returns to within the geofence; and receive, from the IoT device, at the IoT service enable-
ment platform, over the wireless network, and using
the LwM2M protocol, a second location estimate of
the location of the IoT device,
  wherein the second location estimate is within the
  geofence;
in response to receiving the second location estimate,
determine, based on the second location estimate, that
the IoT device is located within the geofence; and
in response to determining that the IoT device is located
within the geofence and receiving the permission to
unlock the device when the IoT device returns to within
the geofence, transmit, from the IoT service enable-
ment platform to the IoT device using the LwM2M
protocol, an additional command to grant access to the
one or more values of the IoT device to the processor
of the IoT device.

14. The IoT service enablement platform of claim 10,
wherein the instructions further cause the IoT service
enablement platform to:
  receive, from a user of the IoT device and at the IoT
  service enablement platform, an additional command to
  relocate the geofence within which the IoT device is
  authorized to operate to a new location; and
  in response to receiving the additional command to relo-
  cate the geofence to the new location, adjust the
  geofence to correspond to the new location.

15. The IoT service enablement platform of claim 10,
wherein receiving the first location estimate of the location
of the IoT device comprises writing to a longitude resource
and a latitude resource defined in an LwM2M Location
Object.

16. The IoT service enablement platform of claim 10,
wherein the first location estimate is received using a
non-terrestrial wireless communication network.

17. At least one non-transitory, computer-readable storage
medium storing instructions, which, when executed by at
least one data processor of a system, cause the system to:
  receive, from an Internet-of-Things (IoT) device, at an
  IoT service enablement platform, over a wireless net-
  work, and using a Lightweight Machine-to-Machine
  (LwM2M) protocol, a first location estimate of a loca-
  tion of the IoT device,
    wherein the first location estimate is outside of a
    geofence within which the IoT device is authorized
    to operate;
  in response to receiving the first location estimate, deter-
  mine, based on the first location estimate, that the IoT
  device is located outside of the geofence; and
  in response to determining that the IoT device is located
  outside of the geofence, transmit, from the IoT service
  enablement platform to the IoT device using the LwM2M protocol, a command to hide one or more
values of the IoT device from access by a processor of
the IoT device.

18. The at least one non-transitory, computer-readable
storage medium of claim 17, wherein the instructions further
cause the system to:
  in response to determining that the IoT device is located
  outside of the geofence, receive an indication that the
  IoT device has been stolen or tampered with; and
  in response to receiving the indication that the IoT device
  has been stolen or tampered with, transmit, from the
  IoT service enablement platform to the IoT device
  using the LwM2M protocol, a command to erase the
  one or more values of the IoT device.

19. The at least one non-transitory, computer-readable
storage medium of claim 17, wherein the instructions further
cause the system to:
  after transmitting the command to hide the one or more
  values of the IoT device from access by the processor
  of the IoT device:
    receive, from a user of the IoT device, permission to
    unlock the device when the IoT device returns to
    within the geofence; and
    receive, from the IoT device, at the IoT service enable-
    ment platform, over the wireless network, and using
    the LwM2M protocol, a second location estimate of
    the location of the IoT device,
      wherein the second location estimate is within the
      geofence;
  in response to receiving the second location estimate,
  determine, based on the second location estimate, that
  the IoT device is located within the geofence; and
  in response to determining that the IoT device is located
  within the geofence and receiving the permission to
  unlock the device when the IoT device returns to within
  the geofence, transmit, from the IoT service enable-
  ment platform to the IoT device using the LwM2M
  protocol, an additional command to grant access to the
  one or more values of the IoT device to the processor
  of the IoT device.

20. The at least one non-transitory, computer-readable
storage medium of claim 17, wherein the instructions further
cause the system to:
  receive, from a user of the IoT device and at the IoT
  service enablement platform, an additional command to
  relocate the geofence within which the IoT device is
  authorized to operate to a new location; and
  in response to receiving the additional command to relo-
  cate the geofence to the new location, adjust the
  geofence to correspond to the new location.

* * * * *